US011754798B2

(12) United States Patent
Fiset et al.

(10) Patent No.: US 11,754,798 B2
(45) Date of Patent: Sep. 12, 2023

(54) IMPACT ABSORBING BREAKAWAY DROP CLAMP SYSTEM

(71) Applicant: Verizon Patent and Licensing Inc., Basking Ridge, NJ (US)

(72) Inventors: Jeremy Fiset, Needham, MA (US); Marc J. Durocher, Jr., Auburn, MA (US); Erik Sheehan, Sparta, NJ (US); Michael D. Hanson, Cumming, GA (US); Richard A. Warter, Auburn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 89 days.

(21) Appl. No.: 17/214,864

(22) Filed: Mar. 28, 2021

(65) Prior Publication Data
US 2022/0308302 A1      Sep. 29, 2022

(51) Int. Cl.
*G02B 6/44* (2006.01)
*F16L 3/13* (2006.01)

(52) U.S. Cl.
CPC .............. *G02B 6/4471* (2013.01); *F16L 3/13* (2013.01)

(58) Field of Classification Search
CPC ....................................................... F16L 3/13
See application file for complete search history.

(56) References Cited

U.S. PATENT DOCUMENTS

| 4,437,633 | A | * | 3/1984 | Andre | ................. | B60R 16/0215 |
| | | | | | | 248/68.1 |
| 4,698,717 | A | * | 10/1987 | Scheid | ..................... | H02G 7/18 |
| | | | | | | 361/114 |
| 5,623,122 | A | * | 4/1997 | Anderson | ................ | H02G 7/18 |
| | | | | | | 174/40 TD |

FOREIGN PATENT DOCUMENTS

CN        208158030 U  * 11/2018

* cited by examiner

*Primary Examiner* — Sung H Pak (57) ABSTRACT

A system supporting a cable to a building is provided. The system includes a device interposed between the cable and the building. The device includes a first portion. The device includes a second portion. The device includes a frangible segment having a break threshold. The frangible segment retains the first and second portions together below the break threshold and releases the first portion from the second portion upon the break threshold being reached.

20 Claims, 5 Drawing Sheets

IMPACT ABSORBING BREAKAWAY DROP CLAMP SYSTEM

BACKGROUND

The present disclosure relates to fiber cables and specifically relates to a system to mitigate cable damage.

Impacts to cables, such as by objects, may cause damage to a cable and/or cause damage to a build to/from which the cable extends.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. The following provides a discussion of some example types of an impact absorbing breakaway drop clamp system in accordance with one or more aspects of the present disclosure.

Figure 1:
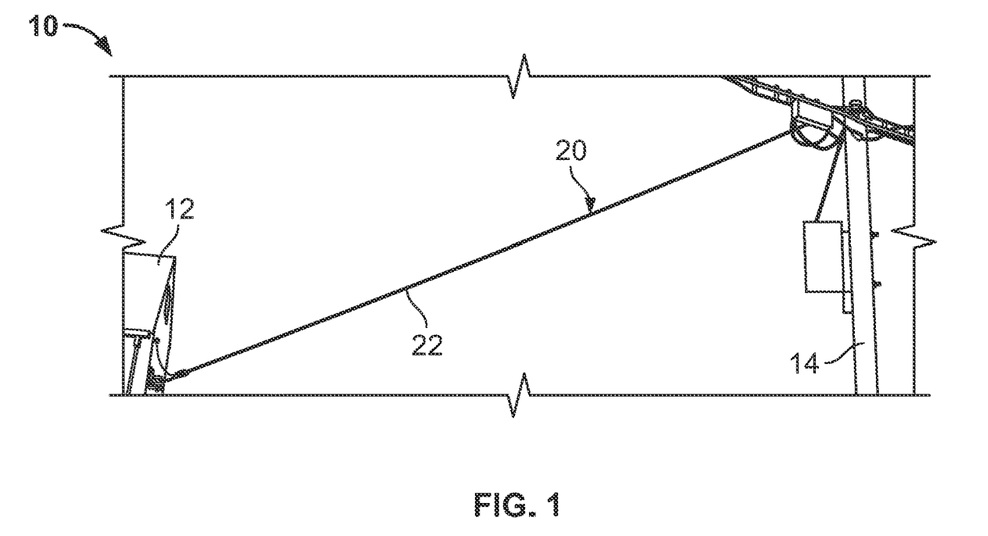
FIG. 1 is a schematic illustration of an example system for supporting a fiber cable and in an example use environment.

FIG. 1 shows an example use environment for an example system 10 for supporting a fiber cable in accordance with at least one aspect of the present disclosure. Within the example use environment, a building 12 is present. Within an example, the building 12 is a dwelling, such as a residential house.

Figure 2:
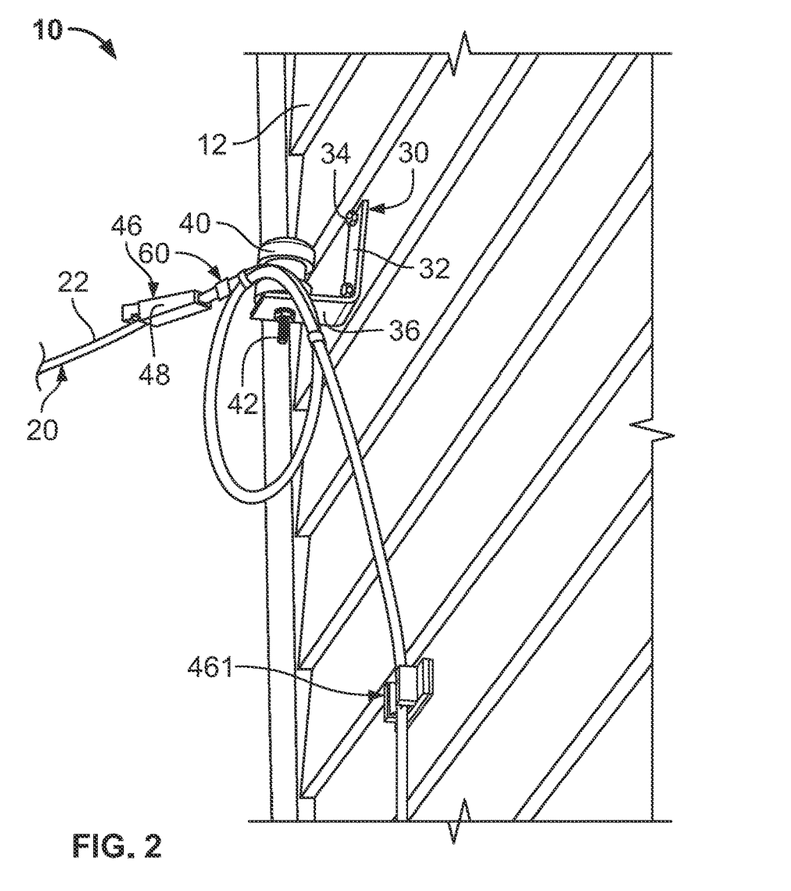
FIG. 2 is a schematic illustration an enlarged view of the system shown in FIG. 1 at an example building of the example use environment.
Figure 3:
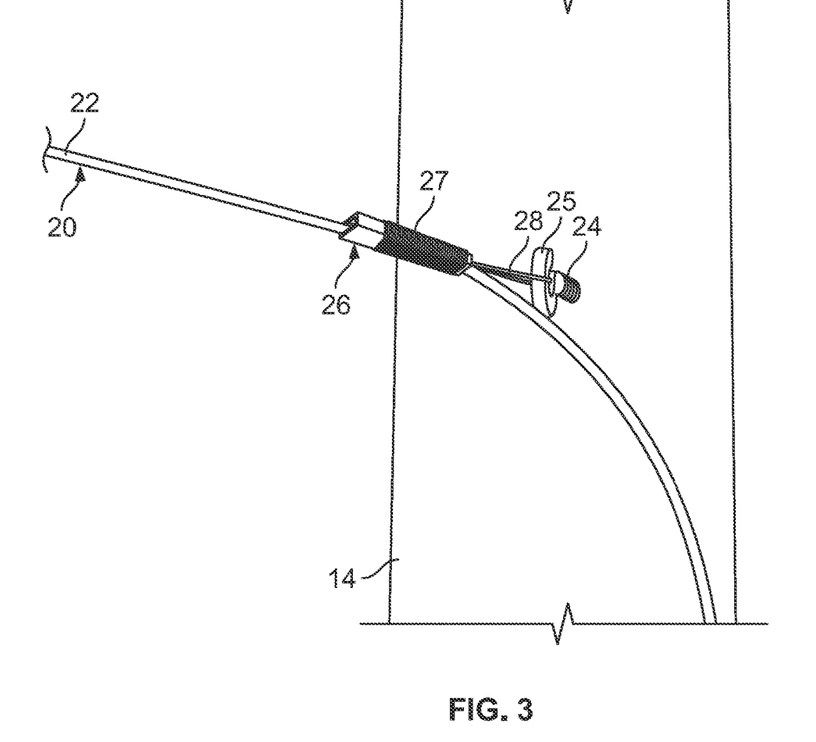
FIG. 3 is a schematic illustration an enlarged view of portions shown in FIG. 1, with the cable secured to an example pole of the example use environment.

Also within the example use environment, a pole 14 is present. An example cable 20 (e.g., a fiber cable) extends in a span 22 from the pole 14 to the building 12. FIG. 2 shows an example connection of the cable 20 to the building 12, with the connection including the system 10. Such will be described further following. FIG. 3 shows an example connection of the cable 20 to the pole 14. The specifics of the example connection of the cable 20 to the pole 14 may be varied and all of such variations of the connection to the pole are within the scope of the present disclosure.

The span 22 of the cable 20 is suspended through open air, with the entire span that is within the open air being at a minimum elevated height above ground. The minimum elevated height maybe associated with a possible natural downward bow of the cable 20 within the span 22 due to gravity.

The cable 20 may be any type. One example cable type is a cable that include optical fibers. The optical fibers are for conveyance of optical signals for communications and the like. Such is the operational function of the optical fibers. The cable 20 may include an outer sheathing that encloses the optical fibers, one or more strengthen members, optical fiber protection/separation material, and the like. It is to be appreciated that the specifics of the cable 20, and the specifics of the components of the cable, need not be limitations upon the present disclosure.

Despite the specifics of the cable 20 and the components of the cable not being limitations upon the present disclosure, it is to be noted that the cable has some level of strength. Such strength logically allows the cable to extend in the span 22 through open air. Also, such strength allows the cable 20 to survive some level of force applied by an impact from an external object (e.g., a falling tree branch or the like) without the cable being severed or otherwise damaged to the point of inoperability of the fibers of the cable. Within an example, the cable 20 has tensile strength rated at about 299-301 lbf. Of course, the cable 20 may have a different strength rating amount.

Focusing upon FIG. 3, as mentioned, connection of the cable 20 to the pole 14 is shown. Within the example, the cable 20 is secured to the pole 14 via any arrangement, including known arrangements. Within the shown example, an anchor screw 24 is secured into the pole 14. The example screw 24 includes a hook portion 25. A P-clamp 26 is also part of the attachment connection of the cable 20 to the pole 14. The example P-clamp 26 has a portion 27 that engages with, e.g., enshrouds and grips, a segment of the cable 20 and the P-clamp 26 includes a loop 28. It is to be understood that the structure of the P-clamp 26 may be varied or even that a different device could be used to engage (e.g., grip) the cable 20 and that such variations/different devices are contemplated and within the scope of this disclosure. The loop 28 of the P-clamp 26 is placed into the hook portion 25 of the screw 24. Thus, the cable 20 is supported from the pole 14.

Focusing upon FIG. 2, as mentioned, connection of the cable 20 to the example building 12 is shown. Within an example, the connection is constructed/configured to help alleviate potential damage to the cable 20 and/or the building 12 upon an impact incident to the cable. As mentioned, such connection includes the system 10. Within an example, the construction/configuration, including the system 10, is to permit release of the cable 20 from the building 12 upon the occurrence of a sufficient impact to the cable. Further, within an example, the permitted release of the cable 20 from the connection to the building 12 occurs at a force impacted to the span 22 of the cable 20 that is less than a force that would cause damage to the cable. As an example, a tree, or other heavy object, falling upon the span 22 of the cable 20 would cause a force that could potentially cause damage to the cable. However, the described construction/configuration permits release at a force level that is lower than a force that would damage the cable 20.

Within an example, the cable 20 is permitted to drop from its suspended location, above the ground, to the ground (FIGS. 1 and 2 showing an example suspended location above ground). Although the cable 20 may drop to the ground, the cable would likely experience little to no damage. As such, communications may still occur though the cable 20. Moreover, within an example, the cable 20 itself need not be repaired/replaced because of the lack of damage to the cable. Within an example, the cable 20 may be re-suspended above the ground via reconnection to the building 12.

Within the example shown in FIG. 2, a bracket 30 is secured to the building 12. Within the shown example, the bracket 30 has a general "L" shape, with a vertical segment 32 affixed to the building 12 via one or more fastening device (e.g., screws or bolts) 34 and a horizontal segment 36 extending away from the building. Different constructions/configurations (e.g., a different bracket or a different item for building attachment) are also contemplated herein, and are within the scope of this disclosure.

Within the shown example, an insulator knob 40 (e.g., a porcelain insulator knob) is affixed to the bracket 30. Within the shown example, the knob 40 is affixed to the horizontal segment 36 of the bracket via a bolt and nut arrangement 42. The knob 40 provides a point to anchor/connect the cable 20 relative to the building 12. Of course, different anchoring/connection structures, fastening locations and fastening arrangements are contemplated and within the scope of this disclosure.

Within one example, the knob 40 is roughly cylindrical, but has a wasp-waist shape. Within the example, the center "waist" has a diameter of about 25-35 mm. Also within the example, the larger portion(s) (e.g., the bottom) below the "waist" has a diameter of about 35-45 mm. Of course, different shapes and dimensions are contemplated and within the scope of the present disclosure. The example dimensions are provided to aid in understanding of general sizes.

Within the shown example, a P-clamp 46 is part of the attachment connection of the cable 20 to the building 12. The example P-clamp 46 comprises a portion 48, that engages with (e.g., enshrouds and grips) a segment of the cable 20, and a loop 50 (see FIG. 4). Within an example, the P-clamp 46 is rated to withstand about 499-501 lbf. It is to be understood that the structure of the P-clamp 46 may be varied (e.g., a different weight rating) or even that a different device could be used to engage (e.g., grip) the cable 20 and that such variations/different devices are contemplated and within the scope of this disclosure.

A device or impact-absorbing breakaway clamp 60 (see the schematic example shown in FIG. 4), in accordance with an aspect of the present disclosure, is also part of the attachment connection of the cable 20 to the building 12. Specifically, the impact-absorbing breakaway clamp 60 is part of the system 10, with the system helping to alleviate potential damage to the cable 20. The clamp 60 is an example of a device for interposition between the cable 20 and the building 12.

Within the shown example, the impact-absorbing breakaway clamp (herein simply "breakaway clamp" or "clamp") 60 is at a location interposed between the P-clamp 46 and the knob 40. Specifically, one part/portion 62 of the breakaway clamp 60 is attached/connected to the P-clamp 46 and another part/portion 64 of the breakaway clamp 60 is attached/connected to the knob 40. See the schematic arrowheads within FIG. 4 that represent the attachments/connections.

The breakaway clamp 60, with the two parts/portions 62, 64, is constructed/configured to permit breakaway of the P-clamp 46, and thus the cable 20 attached thereto, from the knob 40, which is attached to the building 12, upon the occurrence of an impact (e.g., via a falling tree or the like) upon the span 22 of the cable 20 (see FIG. 1). The two parts/portions 62, 64 (FIG. 4) of the breakaway clamp 60 are separable, as indicated by a schematic separation line 66, from each other upon the occurrence of a sufficient force load. Within an example, the breakaway occurs at a force from the impact that is lower than a force that would damage the cable 20.

The separation is via a breaking of a segment of the clamp 60. The segment that breaks is frangible. It is to be appreciated that the frangible segment of the clamp 60 may have a variety of constructions/configurations. Such variety is contemplated and within the scope of the present disclosure. Some example embodiments described later are to help illustrate the variety that is contemplated and within the scope of the present disclosure.

Figure 4:
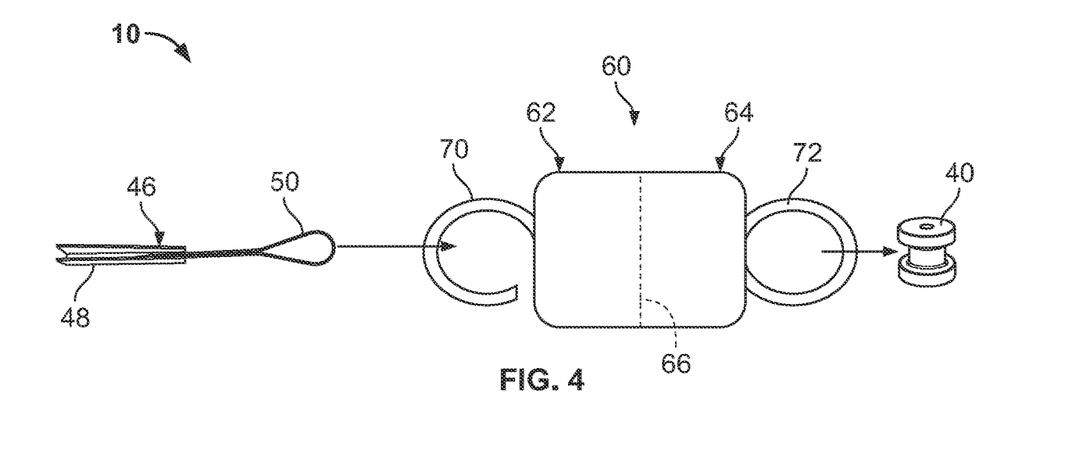
FIG. 4 is a schematic illustration of an example portion of the system of FIG. 1 shown with example portions of the use environment.

It is to be appreciated that FIG. 4 is a schematic illustration of an example of the breakaway clamp 60, with the interposition/attachment between the P-clamp 46 and the knob 40 schematically represented. Such schematic representation is to help to appreciate that the breakaway clamp 60 may have a variety of constructions/configurations, such variety of constructions/configurations is contemplated and such variety of constructions/configurations are within the scope of the present disclosure.

As mentioned, the example, schematic, breakaway clamp includes two parts/portions 62, 64. The two parts/portions 62, 64 each may have a variety of constructions/configurations. As an example representation, a hook 70 is shown for the one part/portion 62. It is to be appreciated that another structure (e.g., a loop) may be used instead of the hook 70. The hook 70 is for connection to the P-clamp 46. Within the example, the loop 50 of the P-clamp 46 is placed into the hook 70 during a process of connecting the cable 20 (FIG. 2) to the building 12 via use of the system 10 that includes the breakaway clamp 60. Within an example, the hook 70 is sized to be about 35-45 mm across an opening. With the P-clamp 46 connected to the cable 20, the one part/portion 62, including the hook 70, is thus associated with the cable.

As an example representation, a loop 72 (FIG. 4) is shown for the other part/portion 64 of the breakaway clamp 60. It is to be appreciated that another structure (e.g., a hook) may be used instead of the loop 72. The loop 72 is for connection to the knob 40. Within the example, the loop 72 of the breakaway clamp 60 is placed over/around the knob 40. Within an example, the loop 72 is sized to be about 35-45 mm across an opening. With the knob 40 connected to the building 12, the other part/portion 64, including the loop 72, is thus associated with the building.

It is to be appreciated that one or more pulling forces may bear upon the two parts/portions 62, 64 (e.g., the hook 70 and loop 72). Such pulling forces are in opposite directions, and such pulling forces urge the two parts/portions 62, 64 (e.g., the hook 70 and loop 72) away from each other. One pulling force is a force caused by the weight of the span 22 of the cable 20 transmitted to the breakaway clamp 60 through the P-clamp 46. Another pulling force that may bear upon the two parts/portions 62, 64 (e.g., the hook 70 and loop 72) may occur as a result of an object (e.g., a falling tree) impacting upon the span 22 of the cable 20.

The two parts/portions 62, 64 (e.g., the hook 70 and loop 72) of the breakaway clamp 60 are retained or held together/close proximity to each other so long as a pull-apart force or break threshold is not exceeded. The two parts/portions 62, 64 (e.g., the hook 70 and loop 72) of the breakaway clamp 60 cease to be retained or held together/close proximity to each other when a pull-apart force or break threshold is exceeded.

As mentioned, the schematic representation (FIG. 4) of the breakaway clamp 60 includes the schematically shown separation line 66. The two parts/portions 62, 64 (e.g., the hook 70 and loop 72) of the breakaway clamp 60 would separate and move away from each other when there is separation at the separation line 66. It is to be appreciated that the schematic representation of the separation line 66 is to indicate that various types of separation, which allows the two parts/portions 62, 64 (e.g., the hook 70 and loop 72) to separate, are contemplated and within the scope of this disclosure. Also, it is to be appreciated that construction/configuration of the breakaway clamp 60 that retains/holds the two parts/portions 62, 64 (e.g., the hook 70 and loop 72) together/in proximity to each other may be varied and that such variation is contemplated and within the scope of this disclosure. It is to be further appreciated that a threshold amount of pull-apart force (e.g., a break-away) may be set/selected by the construction/configuration of the breakaway clamp 60. Such selection of pull-apart force amount (e.g., a break-away) is to prevent pull-apart of the two parts/portions 62, 64 (e.g., the hook 70 and loop 72) via just force from the weight load of the span 22 of the cable 20 and/or other incidental forces, such as forces from wind or minor debris, that would not otherwise cause damage to the cable.

The break-away in accordance with an aspect of the present disclosure allows the cable 20 to release from the suspended location at the building 12 and fall to the ground, without damage, upon being struck by an object (e.g., a falling tree), which would otherwise cause damage (e.g., separating into two pieces) to the cable and/or damage to the building (e.g., mounting being torn away from the building). Such release to prevent damage to cable 20 may not result in the cable falling to ground. However, such occurrence (i.e., the cable 20 falling to ground without damage to the cable) may be considered to be a result that avoids the damage to the cable 20 and/or damage to the building 12.

Figure 5:
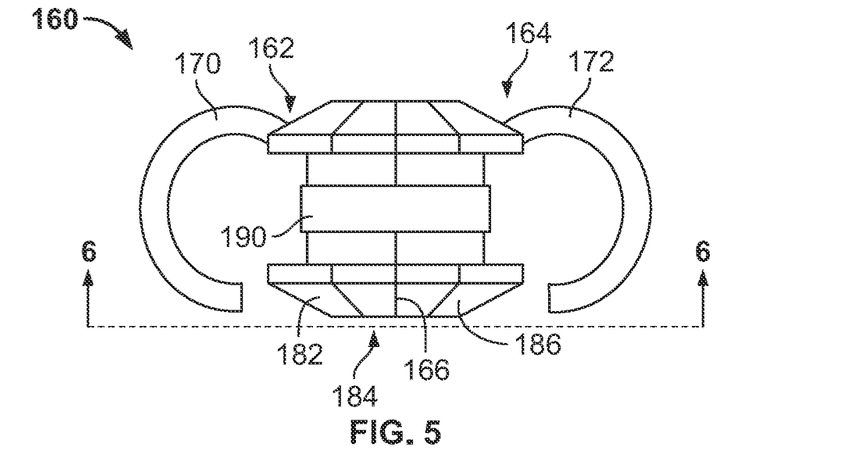
FIG. 5 is a schematic illustration of a first side of a first embodiment of the example portion of the system.
Figure 6:
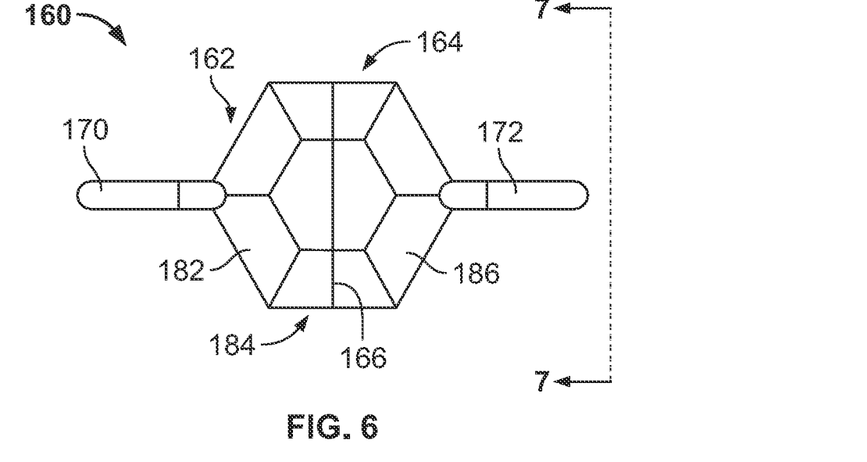
FIG. 6 is a schematic illustration of a second side, as viewed along line 6-6 in FIG. 5, of the first embodiment of the example portion shown within FIG. 5.
Figure 7:
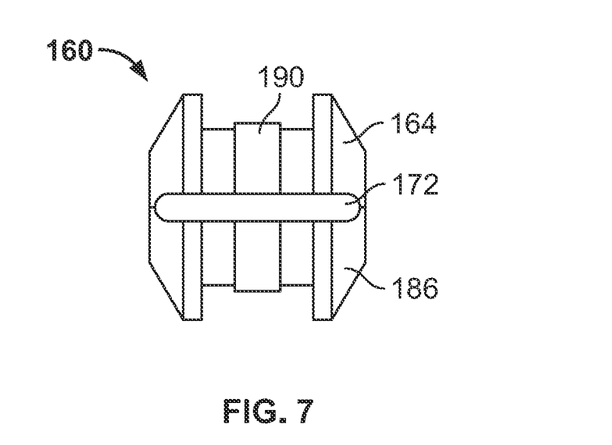
FIG. 7 is a schematic illustration of a third side, as viewed along line 7-7 in FIG. 6, of the first embodiment of the example portion shown within FIG. 5.

FIGS. 5-7 show an example embodiment of a breakaway clamp 160. FIG. 5 shows a first side of the clamp 160. FIG. 6 shows a second side, as viewed along line 6-6 in FIG. 5. FIG. 7 shows a third side, as viewed along line 7-7 in FIG. 6. The clamp 160 is an example embodiment of the schematic, general example of the clamp 60 of FIG. 4. The clamp 160 (FIGS. 5-7) is an example of a device for interposition between the cable 20 and the building 12. With the shown embodiment, a first part/portion 162 includes a hook 170 and a first half 182 of a body 184, and a second part/portion 164 includes a hook 172 and a second half 186 of the body.

The hook 170 is for connection to the P-clamp 46 (reference FIG. 4). With the P-clamp 46 connected to the cable 20, the first part/portion 162, including the hook 170, is thus associated with the cable. The hook 172 is for connection to the knob 40 (reference FIG. 4). With the knob 40 connected to the building 12, the second part/portion 164, including the hook 172, is thus associated with the building. It is to be appreciated at although the example is shown with the hook 172, such may be varied to be a loop or other structure for connection to the knob 40. Such variations of such connection structures are contemplated and within the scope of the present disclosure.

The hook 170 and the first half 182 of the body 184 are fixed together. For example, the hook 170 and the first half 182 of the body 184 may be of a unitary construction or permanently connected (e.g., welded or adhered) together. The hook 172 and the second half 186 of the body 184 are fixed together. For example, the hook 172 and the second half 186 of the body 184 may be of a unitary construction or permanently connected (e.g., welded or adhered) together. Within an example, the hook 170 and the first half 182, and the hook 172 and the second half 186 are of metal material. Within an example, the hook 170 and the hook 172 are made of galvanized steel and have a rated strength of at least about 350-500 lbf. Of course, different materials, strengths, etc. are contemplated and within the scope of this disclosure.

Within an example, the overall length of the breakaway clamp 160 (i.e., from furthest tip of the hook 170 to the furthest tip of the hook 172 or "tip to tip" in FIG. 5) is about 120-160 mm. Within the example, the overall width of the breakaway clamp 160 (i.e., from top to the bottom as viewed in FIG. 5) is about 45-55 mm. Within the example, the overall height of the breakaway clamp 160 (i.e., from top to the bottom as viewed in FIG. 7) is about 45-55 mm. The example dimensions are provided to aid in understanding of general sizes. Of course, different dimensions are contemplated and within the scope of the present disclosure.

The two halves 182, 186 of the body 184 are separate pieces from each other. A separation line 166 indicates the separation of the two pieces (i.e., the two halves 182, 186). The separate pieces (i.e., the two halves 182, 186) contact against each other while the breakaway clamp 160 is not in a break-away condition (e.g., a break-away force has not been applied to the breakaway clamp or does not exceed a break threshold). The separate pieces (i.e., the two halves 182, 186) cease to make contact with each other and move away from each other in response to occurrence of the break-away condition (e.g., a force exceeding a break-away force or threshold is applied to the breakaway clamp 160).

It is to be noted that the body 184, as provided by the two halves 182, 186, may have various constructions and configurations. Within the shown example, the body 184 has a wasp-waist configuration, with a central region having a smaller cross-sectional area than shoulder areas at each end of the central region. However, different constructions and configurations are contemplated and are within the scope of the present disclosure.

A retainer band 190 of the breakaway clamp 160 extends around the first and second halves 182, 186 of the body 184 while the breakaway clamp is not in a break-away condition (e.g., a break-away force has not been applied to the breakaway clamp). The band 190 holds/retains the first and second halves 182, 186 of the body 184 together while the breakaway clamp 160 is not in a break-away condition. The band 190 is constructed/configured to break (e.g., snap, fracture, split or the like) when the pulling force applied to the first and second halves 182, 186 of the body 184 reaches the selected pull-apart force amount or threshold. Within an example, the break threshold of the band is associated with about 200-250 lbf. Different break thresholds are contemplated and within the scope of the present disclosure. As such, the band 190 is an example frangible segment of the clamp 190.

Examples of constructed/configured of the band 190 to permit breakage of the band upon the application of the pull-apart force include: selection of material, selection of one or more dimensions (e.g., width and thickness) of the band, specific portion of the band having selected material, selected dimensions and/or mechanical structures (e.g., perforations of the like). Variations of such construction/configuration of the band 190 are contemplated and within the scope of this disclosure. Within one example, the band 190 includes KEVLAR® material, but of course other materials are contemplated and within the scope of this disclosure.

Figure 8:
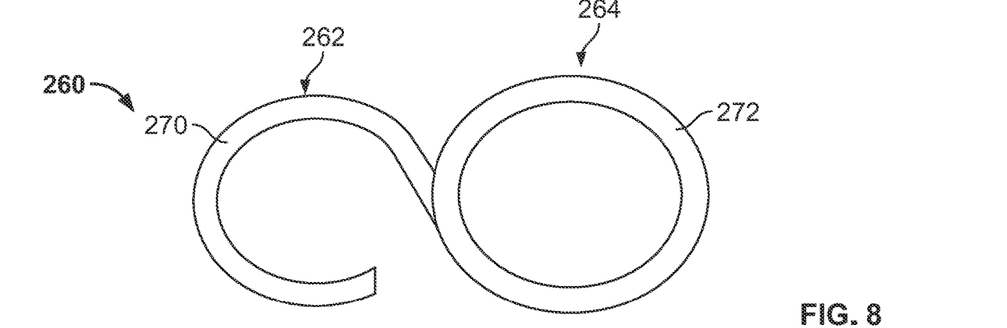
FIG. 8 is a schematic illustration of a second embodiment of the example portion of the system.

FIG. 8 illustrates another embodiment of a breakaway clamp 260. The clamp 260 is an example embodiment of the schematic, general example of the clamp 60 of FIG. 4. The clamp 260 (FIG. 8) is an example of a device for interposition between the cable 20 and the building 12. With the shown embodiment, a first part/portion 262 includes a hook 270 and a second part/portion 264 includes a loop 272.

The hook 270 is for connection to the P-clamp 46 (reference FIG. 4). With the P-clamp 46 connected to the cable 20, the first part/portion 262, including the hook 270, is thus associated (e.g., to be connected via the P-clamp) with the cable. The loop 272 is for connection to the knob 40 (reference FIG. 4). With the knob 40 connected to the building 12, the second part/portion 264, including the loop 272, is thus associated with the building.

The hook 270 and loop 272 may be of a unitary construction or connected (e.g., welded or adhered) together. Within an example, the hook 270 and loop 272 are metal (e.g., galvanized steel) and are connected together with a metal material (e.g., solder, brazing or the like), with the attaching material between the hook and loop have a designed failure (i.e., breaking or separating) threshold.

Despite the hook 270 and loop 272 being of unitary construction or connected, the breakaway clamp 260 is constructed/configured such that the hook and loop will separate from each other in response to occurrence of the break-away condition (e.g., a force exceeding a break-away force is applied to the breakaway clamp). In an example, the separation may be via breaking of material between the hook 270 and the loop 272. Within an example, the break threshold to permit separation is approximately 200-250 lbf. Of course, a different break threshold is contemplated and within the scope of the present disclosure. The hook 270 and the loop 272 may be of greater strength (e.g., rated strength of at least about 350-500 lbf), but an intermediary point, or a point of connection, may have the separation yielding threshold at about 200-250 lbf. Of course, different strengths/thresholds are contemplated and within the scope of the present disclosure. As such, the segment of the clamp 260 that breaks is an example of a frangible segment.

Examples of constructed/configured between the hook 270 and loop 272 to permit the separation (e.g., breakage) upon the application of the pull-apart force include: selection of material, selection of one or more dimensions (e.g., width and thickness) of the band, specific portion of the band having selected material, selected dimensions and/or mechanical structures (e.g., perforations of the like). It is to be appreciated that variations of such construction/configuration are contemplated and within the scope of this disclosure. Within one example, at least some metal material is provided, but of course other materials are contemplated and within the scope of this disclosure.

Within an example, the overall length of the breakaway clamp 260 (i.e., from furthest tip of the hook 270 to the furthest tip of the loop 272 or "tip to tip" in FIG. 8) is about 75-85 mm. Each of the hook 270 and the loop 272 is about 35-45 mm. Within the example, the overall width of the breakaway clamp 260 (i.e., from top to the bottom as viewed in FIG. 8) is about 35-45 mm. The example dimensions are provided to aid in understanding of general sizes. Of course, different dimensions are contemplated and within the scope of the present disclosure.

FIGS. 9-12 show another example embodiment of a breakaway clamp 360. The clamp 360 is an example embodiment of the schematic, general example of the clamp 60 of FIG. 4. The clamp 360 (FIGS. 9-12) is an example of a device for interposition between the cable 20 and the building 12. With the shown embodiment, a first part/portion 362 (FIG. 10) includes a hook 370 and a first half 382 of a body 384, and a second part/portion 364 (FIG. 11) includes a loop 372 and a second half 386 of the body.

Figure 10:
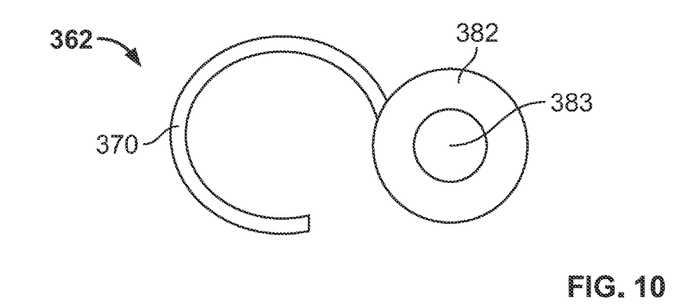
FIG. 10 is a schematic illustration of a first part of the third embodiment shown within FIG. 9.
Figure 11:
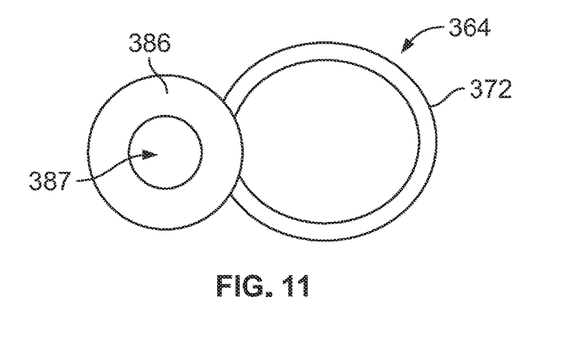
FIG. 11 is a schematic illustration of a second part of the third embodiment shown within FIG. 9.

The hook 370 is for connection to the P-clamp 46 (reference FIG. 4). With the P-clamp 46 connected to the cable 20, the first part/portion 362, including the hook 370, is thus associated with the cable. The loop 372 is for connection to the knob 40 (reference FIG. 4). With the knob 40 connected to the building 12, the second part/portion 364, including the loop 372, is thus associated with the building.

The hook 370 and the first half 382 of the body 384 are fixed together. For example, the hook 370 and the first half 382 of the body 384 may be of a unitary construction or permanently connected (e.g., welded or adhered) together. The loop 372 and the second half 386 of the body 384 are fixed together. For example, the loop 372 and the second half 386 of the body 384 may be of a unitary construction or permanently connected (e.g., welded or adhered) together. Within an example, the hook 370 and the first half 382, and the loop 372 and the second half 386 are of metal material. Of course, different materials are contemplated and within the scope of this disclosure.

The two halves 382, 386 of the body 384 are separate pieces from each other. Each of the two halves 382, 386 of the body 384 has a general appearance of a washer or ring (i.e., a flat "O" shape). The separate pieces contact against each other (e.g., stacked within the view of FIG. 9) while the breakaway clamp 360 is not in a break-away condition (e.g., a break-away force has not been applied to the breakaway clamp). The separate pieces cease to contact against each other and move away from each other in response to occurrence of the break-away condition (e.g., a force exceeding a break-away force is applied to the breakaway clamp). It is to be noted that the body 384, as provided by the two halves 382, 386, may have various constructions and configurations. Of course, the various constructions and configurations are contemplated and within the scope of the present disclosure.

Figure 9:
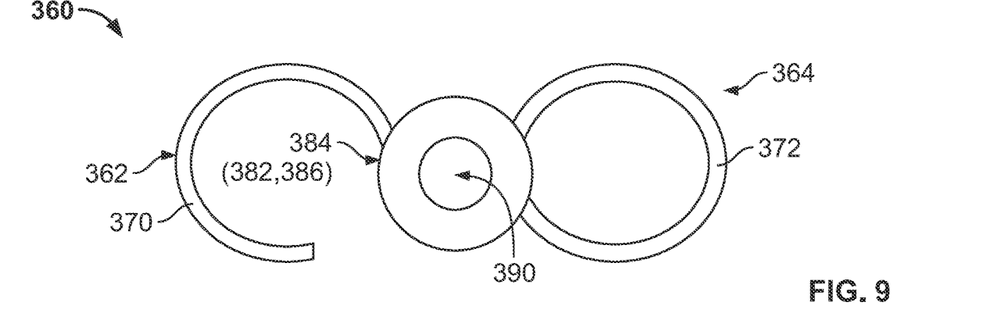
FIG. 9 is a schematic illustration of a third embodiment of the example portion of the system.

Within the shown example, the body 384, as provided by the two halves 382, 386, has a stacked ring/washer configuration. The first half 382 has a center through hole 383 and the second half 386 has a center through hole 387. When the two halves 382, 386 are stacked (as shown in FIG. 9), the center holes 383, 387 are overlaid and with coaxial center through-axes. Within an example, each of the two halves 382, 386 has a thickness of approximately 6 mm (e.g., 5-7 mm). Within an example, each of the two halves 382, 386 are made of galvanized steel and have a rated strength of greater than about 300-500 lbf. Of course, different materials, sizes, strengths, etc. are contemplated and within the scope of this disclosure.

Within an example, the overall length of the breakaway clamp 360 (i.e., from furthest tip of the hook 370 to the furthest tip of the loop 372 or "tip to tip" in FIG. 9) is about 120 mm. Within the example, the overall width of the breakaway clamp 360 (i.e., from top to the bottom as viewed in FIG. 5) is about 35-45 mm. Each of the first part/portion 362 (FIG. 10) and the second part/portion 364 (FIG. 11) has a length of about 70-90 mm (hook 370 being about 35-45 mm, first half 382 being about 35-45 mm, loop 372 being about 35-45 mm, and second half 386 being about 35-45 mm). The example dimensions are provided to aid in understanding of general sizes. Of course, different dimensions are contemplated and within the scope of the present disclosure.

A shear pin 390 (FIG. 12) of the breakaway clamp 360 extends through the first and second halves 382, 386 of the body 384 while the breakaway clamp is not in a break-away condition (e.g., a break-away force has not been applied to the breakaway clamp). The shear pin 390 holds/retains the first and second halves 382, 386 of the body 384 together while the breakaway clamp 360 is not in a break-away condition. The shear pin 390 is constructed/configured to shear (i.e., break or snap) upon the pulling force applied to the first and second halves of the body reaches the selected pull-apart force amount. Within an example, the shear (i.e., break or snap) threshold of the shear pin 390 is associated with about 200-250 lbf. Of course, different strengths/thresholds are contemplated and within the scope of the present disclosure. Within an example, the shear pin 390 is made of relatively soft metal, but other materials are contemplated and are within the scope of this disclosure. As such, the shear pin 390 is an example of a frangible segment of the clamp 360.

Figure 12:
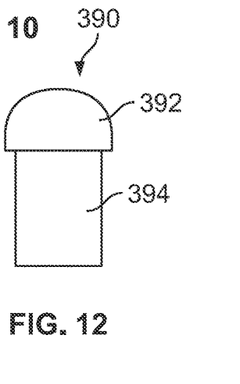
FIG. 12 is a schematic illustration of a third part of the third embodiment shown within FIG. 9.

Within the shown example, the shear pin 390 includes a head 392 that has a diameter greater than respective diameters of the holes, 383, 387. A shaft 394 of the sheer pin 390 has a cross-section diameter slightly smaller than the diameters of the holes, 383, 387. As such, the shaft 394 of the shear pin 390 is located within the holes, 383, 387, and the head 392 prevents complete exiting of the shear pin 390. Of course, the shear pin 390 is sheared into multiple pieces when the breakaway clamp 360 is subjected to the threshold force.

Within an example, the overall height of the shear pin 390 (i.e., from top to bottom in FIG. 12) is about 20 mm (e.g., 15-25 mm), with the head 392 being about 5 mm high (e.g., 4-6 mm), and the shaft 394 being about 15 mm (e.g., 10-25 mm) high. Within the example, the width of the head 392 being about 15 mm and the shaft being about 10 mm (e.g., 8-12 mm). It is to be appreciated that the holes 383, 387 are sized to receive the shaft 394, but not the head 392. The example dimensions are provided to aid in understanding of general sizes. Of course, different dimensions are contemplated and within the scope of the present disclosure.

Figure 13:
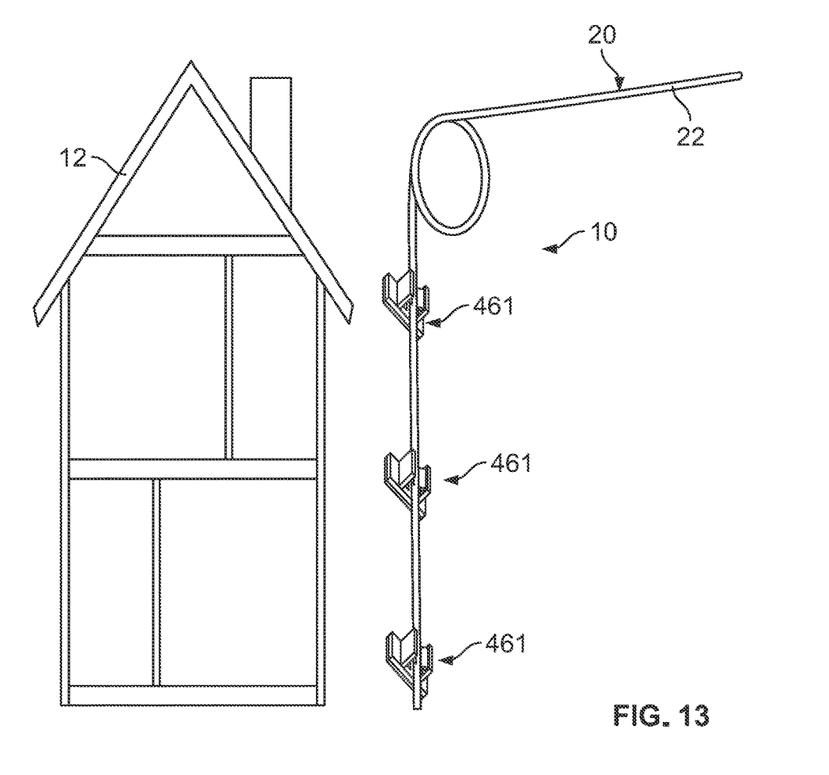
FIG. 13 is a schematic illustration of an example building and an example embodiment of an optional portion of the system.

FIG. 13 illustrates another component of the system 10, according to some embodiments. According to this embodiment, the system 10 may comprise one or more mounting clips 461. Each mounting clip 461 is affixed to the building 12 to hold and guide the cable 20 along an exterior of the building to a termination location or interior cable penetration location on the building. It is to be noted that the building 12 is highly schematized and shown in a smaller scale relative to the clip(s) 461 to provide appreciation that number of clips affixing locations is/are not limitation(s). Within the schematic illustration of FIG. 13, three mounting clips 461 are shown to provide a general example of using the mounting clips 461 along a routing direction (e.g., downward). It is to be appreciated that the number of mounting clips 461 may be varied and it is to be appreciated that the routing (e.g., location(s), direction(s), direction change(s)) may be varied. Such variations are contemplated and within the scope of the present disclosure.

The use of the one or more mounting clips 461 on the building 12 may be in conjunction within the breakaway clamp 60 (e.g., 160, 260, 360). See FIG. 2 which shows an example mounting clip 461 in an example location along the cable 20 and below the shown breakaway clamp 60. The breakaway clamp 60 is associated within an initial point of securement of the cable 20 to the building 12. The one or more mounting clips 461 are for attachment/routing along the building 12 subsequent to the initial point of securement. It is to be recalled that the breakaway clamp 60 helps to alleviate potential damage to the cable 20 via breaking and allowing the cable to fall to the ground. Again, such help is to avoid damage to the cable 20 and the building 12. The one or more mounting clips 461 provide a similar function(s) of allowing the cable 20 to fall to the ground and help to avoid damage to the cable and the building 12.

Each mounting clip 461 is constructed/configured to hold/retain the cable 20 at the location of the mounting clip 461 until a sufficient pull force is applied to the cable. However, such pull force is selected to be below forces that would damage the cable 20, the mounting clip(s) 461 and/or the building 12. So, the cable 20 may release from the mounting clip(s) 461 and fall to the ground without damage. As mentioned, such falling to ground may be associated with the wire being struck by an object (e.g., a falling tree), which would otherwise cause damage to the cable and/or damage to the building.

Such release to prevent damage to cable 20 may result in the cable falling to ground. However, despite the fall, damage to the cable 20 and/or damage to the building 12 is prevented.

Figure 14:
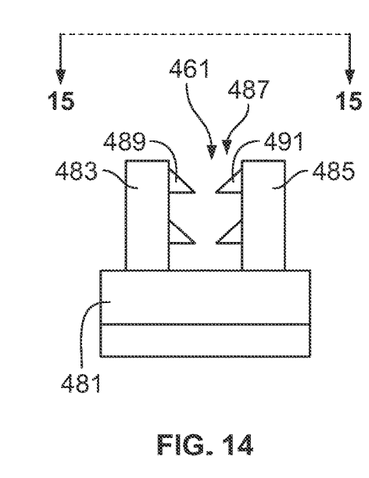
FIG. 14 is a schematic illustration of a first side of a part of the system shown in FIG. 13.
Figure 15:
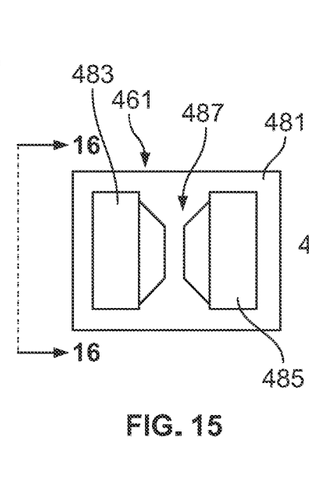
FIG. 15 is a schematic illustration of a second side, as viewed along line 15-15 in FIG. 14, of the part shown in FIG. 14.
Figure 16:
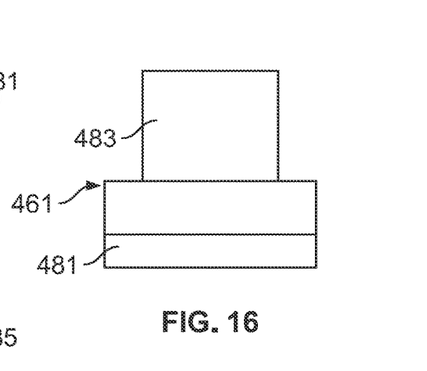
FIG. 16 is a schematic illustration of a third side, as viewed along line 16-16 in FIG. 15, of the part shown in FIG. 14.

An example of the mounting clip 461 is shown within FIGS. 14-16. The mounting clip 461 include a base 481 for securing the mounting clip 461 to the building. The base may be secured to the building via any suitable manner. For example, a fastener, such as a nail or screw, may be driven through the base 481 and into the building. Of course, other ways (e.g., adhesive) of securing the base 481 to the house are contemplated and within the scope of this disclosure.

Two fingers 483, 485 extend from the base 481. The fingers 483, 485 are spaced apart so as to provide a gap space 487 therebetween. The length of the extent of the fingers 483, 485 from the base 481 may be related to the size (i.e., cross-sectional diameter) of the cable 20. The gap space 487 is sized (i.e., distance between the fingers 483, 485) to be related to the size (i.e., cross-sectional diameter) of the cable

20. The cable 20 is to be able to be located within the gap space 487. Also, the fingers 483, 485 are to bear upon (i.e., squeeze) the cable 20 located within the gap space 487. Such squeezing of the cable grips and retains the cable within the gap space 487.

It is to be noted that the fingers 483, 485 bound an open end or open face at the end of the gap space 487. The open end allows the cable 20 to be pushed into the gap space 487. Also, the open end allows the cable 20 to be pulled from the gap space 487 between the fingers 483, 485 when a sufficient pulling force is applied to the cable. Such pulling force is below the force limit that would cause the cable 20 to break. In an example, the pulling force may be at or near force from the weight of the cable.

Within the shown example, inwardly-facing teeth 489, 491 are located on the fingers 483, 485. The teeth 489, 491 extend into the gap space 487. The teeth 489, 491 may provide for supplemental gripping and retention of the cable 20.

Within an example, each mounting clip 461 is made at least partially of resilient material, such as rubber. Within an example, the fingers 483, 485, and teeth 489, 491 thereon, are made of resilient material (e.g., rubber).

As mentioned, the cable 20 may be pressed into the gap space 487, and the resilience permits some deflection to accommodate and receive the cable. Moreover, the resilience may help provide the gripping and retention (e.g., via friction) of the cable 20. Still further, the resilience may help permit release of the cable upon application of the pulling force on the cable 20.

According to some embodiments, a system is provided. The system includes a device interposed between a cable and a building. The device includes a first portion, a second portion, and a frangible segment having a break threshold. The frangible segment retains the first and second portions together below the break threshold and releases the first portion from the second portion upon the break threshold being reached.

According to some embodiments, the cable comprises optical fibers.

According to some embodiments, the frangible segment includes a band extending around at least one of the first portion or the second portion.

According to some embodiments, the band is made of a first material and at least one of the first portion or the second portion is made of a second material different than the first material of the band.

According to some embodiments, one of the first and second portions includes a hook and the other the first and second portions includes a loop.

According to some embodiments, the frangible segment interconnects the hook and the loop.

According to some embodiments, the frangible segment includes a shear pin.

According to some embodiments, the system includes a mounting clip for attaching the cable to the building at a location subsequent to an initial point of securement of the cable to the building with the device.

According to some embodiments, the mounting clip includes fingers for receiving the cable.

According to some embodiments, at least one finger of the pair of fingers includes one or more teeth for retaining the cable.

According to some embodiments, a system for supporting a cable to a building is provided. The system includes a device interposed between the cable and the building. The device includes a loop for placement around a knob attached to the building, a hook for connection to the cable, and a frangible segment having a break threshold. The frangible segment retains the loop and the hook together below the break threshold and releases the loop from the hook upon the break threshold being reached.

According to some embodiments, the frangible segment includes a band extending around at least one of the loop or the hook.

According to some embodiments, the frangible segment includes a shear pin.

According to some embodiments, the system includes a bracket for attaching the knob to the building.

According to some embodiments, the frangible segment is made of a material and at least one of the loop or the hook is made of a material different than the material of the frangible segment.

According to some embodiments, the system includes a mounting clip for attaching the cable to the building at a location subsequent to an initial point of securement of the cable to the building with the device.

According to some embodiments, a system for supporting a cable to a building is provided. The system includes a device interposed between the cable and the building. The device includes a first portion associated with the cable, a second portion associated with the building, and a frangible band having a break threshold. The frangible band retains the first and second portions together below the break threshold and releases the first portion from the second portion upon the break threshold being reached.

According to some embodiments, the cable comprises optical fibers.

According to some embodiments, the band is made of a material and at least one of the first portion or the second portion is made of a material different than the material of the band.

According to some embodiments, the system includes a mounting clip for attaching the cable to the building at a location subsequent to an initial point of securement of the cable to the building with the device.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

What is claimed is:

1. A system comprising:
    a device interposed between a cable and a building, the device comprising:
        a first portion comprising a first hook;
        a second portion comprising a second hook; and
        a frangible segment having a break threshold, the frangible segment retaining the first and second portions together below the break threshold and releasing the first portion comprising the first hook from the second portion comprising the second hook upon the break threshold being reached; and
    a mounting clip for attaching the cable to the building at a location subsequent to an initial point of securement of the cable to the building with the device, wherein the mounting clip includes a first finger and a second finger, wherein the first finger is spaced apart from the second finger so as to provide a gap space for receiving the cable.

2. The system of claim 1, wherein the cable comprises optical fibers.

3. The system of claim 1, wherein the frangible segment includes a band extending around at least one of the first portion or the second portion.

4. The system of claim 3, wherein the band is made of a first material and at least one of the first portion or the second portion is made of a second material different than the first material of the band.

5. The system of claim 1, wherein a first end of the first hook is at a same side of the device as a second end of the second hook.

6. The system of claim 1, wherein the frangible segment interconnects the first hook and the second hook.

7. The system of claim 1, wherein the frangible segment includes a shear pin.

8. The system of claim 1, wherein at least one of the first finger or the second finger includes one or more teeth extending into the gap space.

9. The system of claim 1, wherein the first finger includes one or more teeth for retaining the cable.

10. The system of claim 9, wherein the second finger includes one or more second teeth for retaining the cable.

11. A system for supporting a cable to a building, the system comprising:
    a device interposed between the cable and the building, the device comprising:
        a first portion comprising a loop for placement around a knob attached to the building;
        a second portion comprising a hook for connection to the cable; and
        a frangible segment having a break threshold, the frangible segment retaining the first portion comprising the loop and the second portion comprising the hook together below the break threshold and releasing the first portion comprising the loop from the second portion comprising the hook upon the break threshold being reached; and
    a mounting clip for attaching the cable to the building at a location subsequent to an initial point of securement of the cable to the building with the device, wherein the mounting clip includes a first finger and a second finger, wherein the first finger is spaced apart from the second finger so as to provide a gap space for receiving the cable.

12. The system of claim 11, wherein the frangible segment includes a band extending around at least one of the loop or the hook.

13. The system of claim 11, wherein the frangible segment includes a shear pin.

14. The system of claim 11, comprising a bracket for attaching the knob to the building.

15. The system of claim 11, wherein the frangible segment is made of a material and at least one of the loop or the hook is made of a material different than the material of the frangible segment.

16. The system of claim 11, wherein at least one of the first finger or the second finger includes one or more teeth extending into the gap space.

17. A system for supporting a cable to a building, the system comprising:
    a device interposed between the cable and the building, the device comprising:
        a first portion comprising a first hook and associated with the cable;
        a second portion comprising a second hook and associated with the building; and
        a frangible band having a break threshold, the frangible band retaining the first and second portions together below the break threshold and releasing the first portion comprising the first hook from the second portion comprising the second hook upon the break threshold being reached; and
    a mounting clip for attaching the cable to the building at a location subsequent to an initial point of securement of the cable to the building with the device, wherein the mounting clip includes a first finger and a second finger, wherein the first finger is spaced apart from the second finger so as to provide a gap space for receiving the cable.

18. The system of claim 17, wherein the cable comprises optical fibers.

19. The system of claim 17, wherein the frangible band is made of a material and at least one of the first portion or the second portion is made of a material different than the material of the frangible band.

20. The system of claim 17, wherein at least one of the first finger or the second finger includes one or more teeth extending into the gap space.

\* \* \* \* \*